United States Patent [19]

Hammond et al.

[11] 3,710,622
[45] Jan. 16, 1973

[54] VISCOSITY COMPENSATED DUAL ROTOR TURBINE FLOWMETER

[75] Inventors: Jack Hammond; Charles L. Boyd, both of Duncan, Okla.

[73] Assignee: Halliburton Company, Duncan, Okla.

[22] Filed: Feb. 24, 1971

[21] Appl. No.: 118,465

Related U.S. Application Data

[63] Continuation of Ser. No. 859,743, Sept. 22, 1969, abandoned.

[52] U.S. Cl. ............................................. 73/231 R
[51] Int. Cl. ............................................. G01f 1/10
[58] Field of Search ..................... 73/194, 229-231, 73/253-261

[56] References Cited

UNITED STATES PATENTS 3,201,987   8/1965   Ackerman .......................... 73/231 M Primary Examiner—Charles A. Ruehl
Assistant Examiner—C. E. Snee, III
Attorney—Burns, Doane, Swecker & Mathis

[57] ABSTRACT

Method and apparatus for the electronic compensation for the effects of viscosity in turbine flowmeters in which the difference between the frequencies of the digital output signals from a magnetic detector associated with each of two rotors having substantially the same water calibration constant and similarly shaped frequency to kinematic viscosity ratio curves is either subtracted from or added to the lesser of the two output signal frequencies or substracted from the greater of the two output signal frequencies, depending on the value of the ratio of frequency to kinematic viscosity, and appropriately scaled for direct reading.

21 Claims, 5 Drawing Figures $$f_c = \frac{f_2 - \frac{f_1 - f_2}{S_1}}{S_2}$$

INVENTORS
Jack Hammond
Charles L. Boyd
BY
Burns, Doane, Benedict, Swecker & Mathis
ATTORNEYS

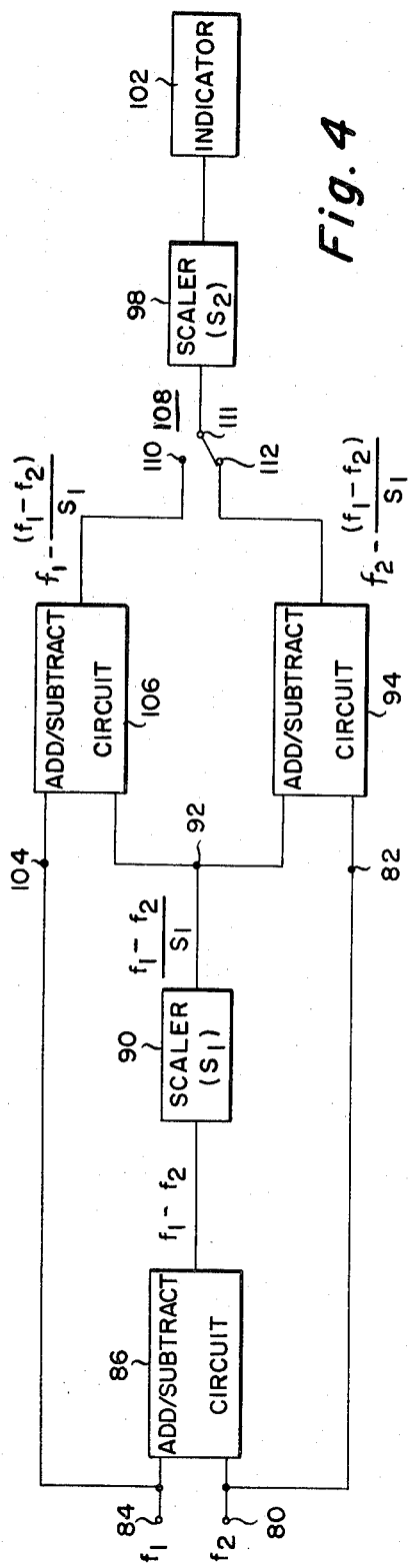
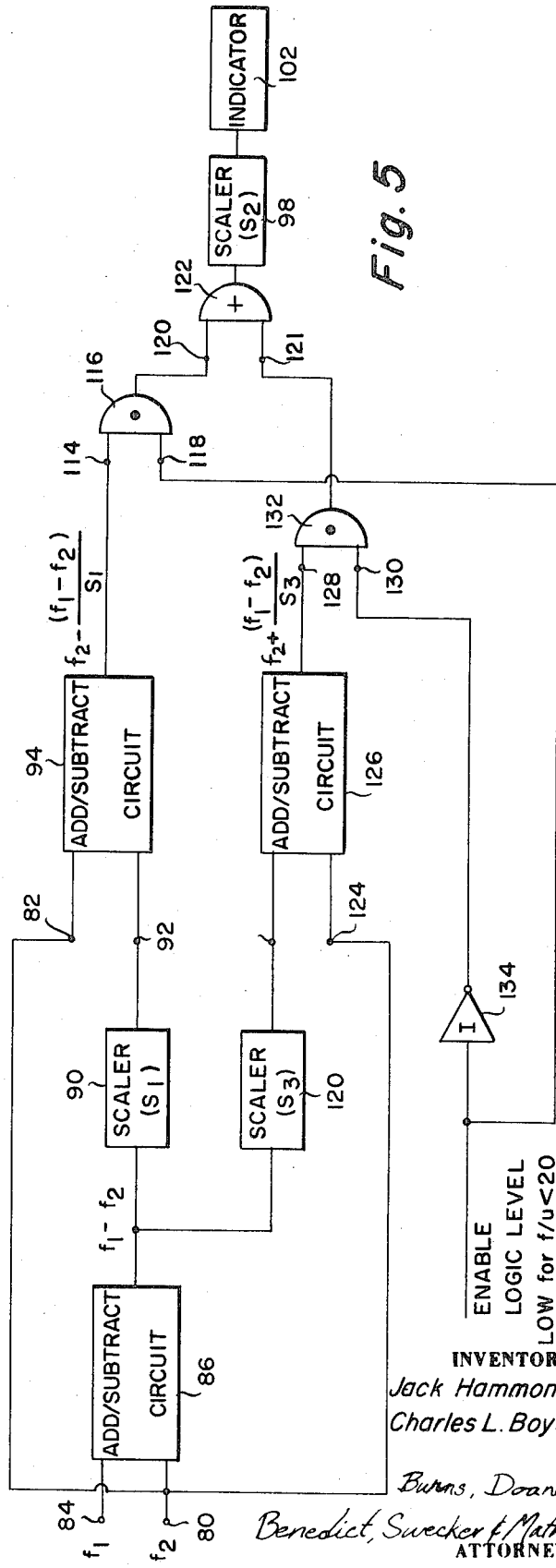

VISCOSITY COMPENSATED DUAL ROTOR TURBINE FLOWMETER

RELATED APPLICATIONS

This application is a continuation of application Ser. No. 859,743, filed Sept. 22, 1969, for "VISCOSITY COMPENSATED DUAL ROTOR TURBINE FLOWMETER", now abandoned.

BACKGROUND OF THE INVENTION

Turbine flowmeters are well known in the art and have countless applications in the measuring of both the rate and total fluid flow. These turbine flowmeters are conventionally calibrated with water to read in the desired fluids units. This water calibration factor is substantially linear over the operating range of the flowmeter.

The calibration factor of turbine flowmeters is, however, non-linear when measuring viscous fluids. While repeatable, the ratio of the frequency of the digital output signal to the kinematic viscosity is a rather complex curve heretofore necessitating the utilization of extremely complex electronic circuitry designed to track the curve and provide a number of pulses which could be added to or subtracted from the digital output signal to compensate the meter for the viscous non-linearity.

The non-linearity of the conventional turbine flowmeter is a function of the design of the rotor element and is typically on the order of approximately 3 percent or more. This degree of non-linearity is, of course, unacceptable for many applications.

It is accordingly an object of the present invention to provide a novel method and apparatus for compensating the output signal of a digital turbine flowmeter for non-linearities due to viscosity of the fluid.

It is another object of the present invention to provide a novel flowmeter having twin rotors independently rotatable in response to the fluid flow.

It is still another object of the present invention to provide a novel method and electronic circuit for processing the digital output signals of a fluid flowmeter.

These and other objects and advantages of the present invention will be readily apparent to one skilled in the art from a perusal of the claims and from the following detailed description of a preferred embodiment when read in conjunction with the appended drawings.

THE DRAWINGS

The novel method and apparatus of the present invention may be more easily understood by reference to the drawings in which.

THE PREFERRED EMBODIMENT

Figure 1:
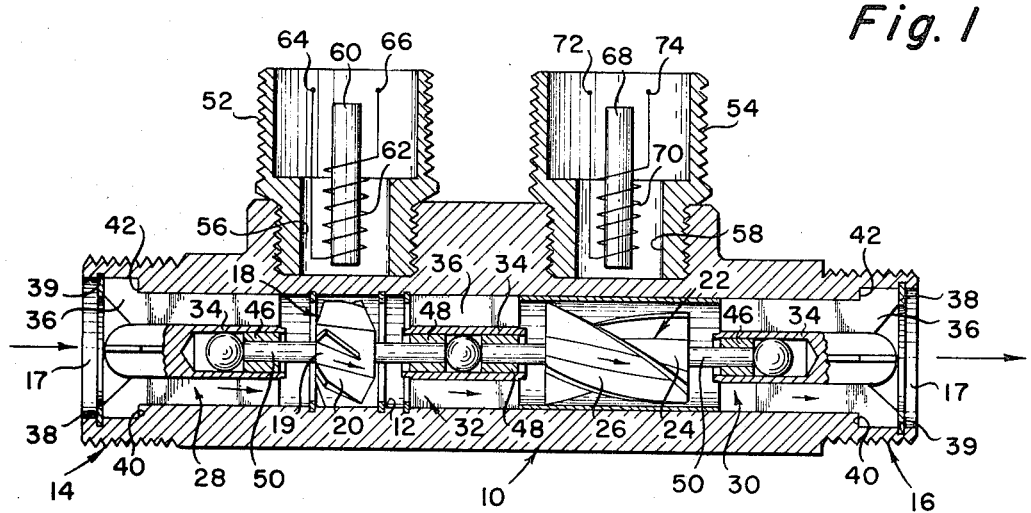
FIG. 1 is a side elevation view of a vertical section taken through the longitudinal axis of a preferred embodiment of the flowmeter of the present invention.

A preferred embodiment of the novel turbine flowmeter of the present invention is illustrated in FIG. 1. With reference to FIG. 1, the housing of the flowmeter comprises an elongated, non-magnetic tubular body 10 with an axial bore 12 extending therethrough. The fluid inlet end 14 and the fluid outlet end 16 of the tubular body 10 may be provided with concentric counterbores 17 slightly larger in diameter than the diameter of the bore 12 for a reason subsequently to be explained. Both ends 14 and 16 of the body 10 may be externally threaded in a conventional manner to facilitate the coupling of the flowmeter into a conduit (not shown) through which the flow of fluid is to be monitored.

A first rotor assembly 18 having a hub 19 and a plurality of blades 20 projecting outwardly therefrom may be journaled for relatively friction-free rotation within the bore 12 of the body 10 about the axis thereof in response to fluid flow therethrough. A second rotor assembly 22 having a hub 24 and a plurality of blades 26 projecting outwardly therefrom may be journaled downstream of the first rotor assembly 18 for relatively friction-free rotation within the bore 12 of the body 10 about the axis thereof in response to fluid flow therethrough. The blades 20 and 26 of the rotor assemblies 18 and 22 may be paramagnetic in whole or in part.

A pair of conventional vane assemblies 28 and 30 may be provided within the bore 12 at the inlet and outlet ends 14 and 16, respectively, of the body 10. These vane assemblies 28 and 30, together with a third vane assembly 32 intermediate the two rotor assemblies 18 and 22, each comprises a central hub 34 coaxial with the bore 12 and a plurality of vanes 36 extending radially outward therefrom. The vane assemblies 28 and 30 may be conventionally secured against withdrawal from the respective ends 14 and 16 of the bore 12 by snap rings 38 inserted in grooves 39 in the counterbores 17.

Further insertion of the vane assemblies 28 and 30 may also be conventionally prevented by means of the abutment of the inwardly facing shoulders 40 on the vanes 36 with the outwardly facing shoulders 42 formed by the junction of the bore 12 with the concentric counterbores 17. Axial movement of the intermediate vane assembly 32 may, of course, be prevented by the axial locking of the upstream and downstream vane assemblies 28 and 30 in the manner described.

The vane assemblies 28, 30 and 32 are customarily utilized to reduce the turbulence of the fluid flowing through the bore 12 of the body 10. The retaining means and general mechanical details of the rotor and vane assemblies are entirely conventional and may be, for example, of the type described more fully in the Groner et al. U.S. Pat. No. 3,164,020, assigned to the assignee of the present invention. A further function of the assemblies 28, 30 and 32 may be, as in the aforesaid patent, that of providing support for the sleeve and thrust bearings 46 and 48 respectively for the shafts 50 upon which the rotor assemblies 18 and 22 turn.

A first detector assembly 52 may be located adjacent the first rotor assembly 18 in a blind bore 56 extending inwardly from the external surface of the body 10 normal to the axis of the bore 12. The detector assembly 52 may be conventional in construction and operation and may be, for example, of the type more fully described in the aforesaid patent having a permanent magnet 60, a coil 62 wound thereon, and a pair of output terminals 64 and 66. The magnetic lines of flux emanating from the permanent magnet 60 extend into the bore 12 in the area through which the blades 20 of the rotor assembly 18 are rotated in response to fluid flow through the bore 12.

A second detector assembly 54 may be located in a similar blind bore 58 adjacent the second rotor assembly 22 extending inwardly from the outer surface of the body 10 normal to the axis of the bore 12. The second detector assembly 54 may be similar in construction to the first detector assembly 52 earlier described having a permanent magnet 68, a coil 70 wound thereon and a pair of output terminals 72 and 74.

The spacing between the rotor assemblies 18 and 22 is desirably such that each is substantially unaffected by the presence of the other. The intermediate vane assembly 32 may, of course, be utilized as a spacer as well as a fluid flow turbulence reducer. Moreover, the spacing between the two detector assemblies 52 and 54 is desirably such that the magnetic lines of flux within the bore 12 emanating from the permanent magnets associated with each will be intersected only by the rotor blades of the immediately adjacent rotor assembly.

In operation, rotation of the paramagnetic blades 20 of the rotor assembly 18 through the lines of magnetic flux emanating from the permanent magnet 60 in response to fluid flow through the bore 12 of the body 10 reduces the reluctance of the magnetic flux path thereby increasing the strength of the flux. The change in flux strength is sensed by the coil 62 and is manifested at the output terminals 64 and 66 as a series of electrical impulses. Since the speed of rotation of the rotor assembly 18 is related to the fluid flow through the bore 12, the frequency or pulse repetition rate of the electrical impulses appearing the output terminals 64 and 66 will be related to the fluid flow through the bore 12.

The second rotor assembly 22 cooperates with the second detector assembly 54 in substantially the same manner described in connection with the rotor assembly 18 and the detector 52 to produce a second series of electrical impulses at the output terminals 72 and 74. The frequency or pulse repetition rate of these output pulses is, of course, also related to fluid flow through the bore 12.

Because the vane assembly 32 intermediate the rotor assemblies 18 and 22 substantially reduces the interaction which might otherwise exist between the rotor assemblies, the rotor assemblies 18 and 22 rotate independently of each other in response to fluid flow. The relatively small separation between the rotor assemblies 18 and 22 is desirable in that it permits almost simultaneous response by both rotor assemblies to variations in fluid flow.

While the frequency of the output pulses of the two detector assemblies 52 and 54 is related to fluid flow through the bore 12, the blades 20 and 26 respectively of the rotor assemblies 18 and 20 may be made to differ physically in the length, pitch, shape or other physical characteristics or combinations thereof so that the speed of rotation of the rotor assemblies and thus the number of pulses will not be the same for a given rate of fluid flow. It is important, however, that the water calibration factors of the rotor assemblies be approximately the same, i.e., the number of electrical pulses produced per gallon of water flowing through the bore 12 under steady flow conditions should be substantially the same.

Figure 2:
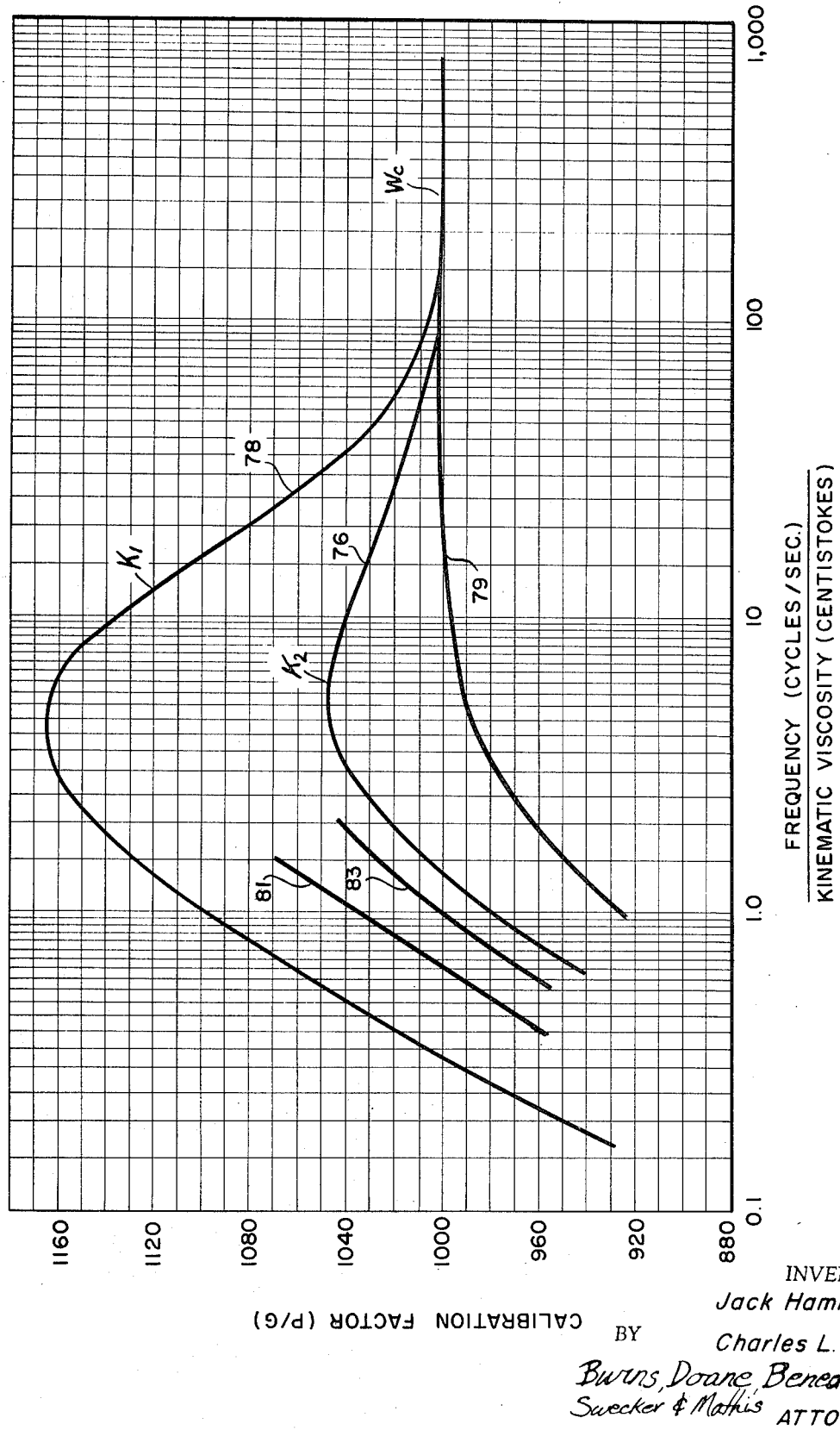
FIG. 2 is a graph illustrating typical kinematic viscosity correction curves for the two rotor assemblies of the flowmeter of FIG. 1.

In addition, the rotor assemblies 18 and 22 may be selected to provide nonlinear viscous fluid calibration factor curves related in shape such as the curves 76 and 78 illustrated in FIG. 2. With reference to FIG. 2, the curve of the ratio between the frequency of the output signal of the detector 52 to kinematic viscosity of the fluid may be plotted, by way of example, against the calibration factor as a curve 76 with the characteristic nonlinearly portion peaking at about five cycles per second centistokes. Similarly, the curve 78 may be plotted for the detector 54. The selected rotor assemblies 18 and 22 should produce calibration curves with viscous fluids that are similarly shaped and peaked at approximately the same value of frequency over kinematic viscosity. The calibration curve of one rotor assembly, e.g., rotor assembly 20, will thus always exhibit a greater percentage of nonlinearity than that of the other rotor assembly 18. The difference in degree of nonlinearity is determined, of course, by the selected blade design.

The aforesaid relationship between the viscous calibration factor curves 76 and 78 of the rotor assemblies 18 and 22 will be manifested as a difference in the frequency or pulse repetition rates of the output signals respectively from the detector assemblies 52 and 54.

Figure 3:
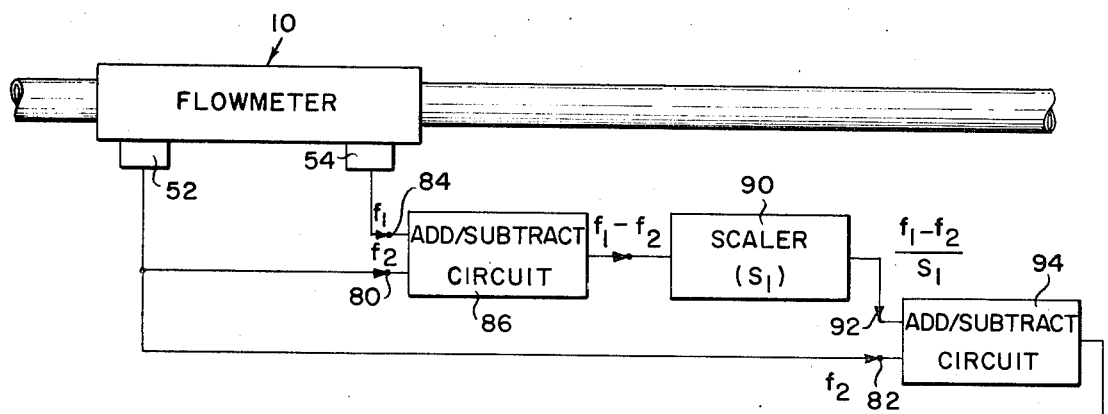
FIG. 3 is a functional block diagram of the compensation circuit of the present invention.
Figure 3:
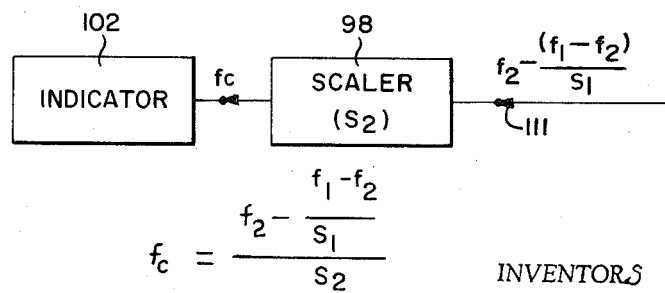

The output signals derived from the detector assemblies 52 and 54 may be applied to the circuit of FIG. 3 to compensate for the non-linearities of one of the output signals. With reference to FIG. 3, the signal $f_2$ from the detector assembly 52 may be applied to an input terminal 80 and 82 respectively of a pair of conventional add/subtract circuits 86 and 94. The output signal $f_1$ from the detector assembly 54 may be applied to the other input terminal 84 of the add/subtract circuit 86 and the output signal therefrom applied to the other input terminal 92 of the add/subtract circuit 94 by way of a conventional scaler 90. The output signal from the add/subtract circuit 94 may then be applied to a suitable indicator 102 by way of a second conventional scaler 98.

The add/subtract circuits 86 and 94 may be entirely conventional in circuitry and operate to provide an output signal in which the number of pulses is related to the difference between the number of pulses in the two input signals. The scalers 90 and 98 may likewise be conventional and may simply comprise a plurality of series connected binary elements operable to provide a single output pulse each time a predetermined number of input pulses are applied thereto. The indicator 102 may comprise a simple pulse counter and/or rate meter as desired whereby the indication may be of total number of pulses received over a predetermined time interval or the instantaneous rate of fluid flow.

In operation, the output signals $f_2$ and $f_1$ respectively of the detector assemblies 52 and 54 may be applied to the subtractor circuit 86 and the output signal therefrom reduced by a predetermined factor $S_1$ in the scaler 90. The output signal $f_1 - f_2/S_1$ from the scaler 90 may be subtracted from the output signal $f_2$ of the detector assembly 52 in the add/subtract circuit 94. The output signal from the add/subtract circuit 94 may be expressed $f_2 - (f_1 - f_2)/S_1$ and may then be scaled in the second scaler 98 by a second predetermined scaling factor $S_2$. The output signal from the scaler 98 applied to the indicator 102 is the compensated signal $f_c$ and may be expressed as:

$$f_c = [f_2 - (f_1 - f_2)/S]/S_2 \quad (1)$$

The scaling factor $S_1$ may be obtained empirically, for example, from the graph of FIG. 2 where the factor $S_1$ may be selected as the means value of the ratio between the difference between the curves 76 and 78 of the viscous calibration factors of the two rotor assemblies 18 and 22 and the difference between the curve 76 and the water calibration factor $W_c$ for several values of $f/u$.

$$S_1 = (K_1 - K_2)/(K_2 - W_c) \quad (2)$$

As previously stated, $S_1$ may be calculated empirically. Consider, by way of example, the graph of FIG. 2 from which the following may be taken and $S_1$ calculated by means of equation (2):

| $f/u$ | $K_1$ | $K_2$ | $W_c$ | $K_1-K_2$ | $K_2-W_c$ | $S_1$ |
|---|---|---|---|---|---|---|
| 100 | 1007 | 1002 | 1000 | 5 | 2 | 2.500 |
| 80 | 1010 | 1004 | 1000 | 6 | 4 | 1.500 |
| 60 | 1018 | 1007 | 1000 | 11 | 7 | 1.571 |
| 40 | 1035 | 1012 | 1000 | 23 | 12 | 1.917 |
| 30 | 1052 | 1018 | 1000 | 34 | 18 | 1.889 |
| 20 | 1080 | 1026 | 1000 | 54 | 26 | 2.077 |
| 10 | 1137 | 1042 | 1000 | 95 | 42 | 2.267 |
| 8 | 1150 | 1045 | 1000 | 105 | 45 | 2.333 |
| 6 | 1162 | 1048 | 1000 | 114 | 48 | 2.375 |

The sum of the individual $S_1$ values in the above chart is 18.429. Dividing this total by the number of $f/u$ values considered, in this case 9, yields a mean values $S_1$ of approximately 2.

Using a mean correction factor $S_1$ of 2, the effectiveness of the present invention for compensating for the non-linearity of the curves of FIG. 2 may be illustrated. Consider equation (1) where the meter scaling factor $S_2$ is unity and where $f/u = 60$, $K_1 = 1018$, and $K_2 = 1007$:

$$f_c = 1007 - (11/2)/1 = 1001.5 \quad (3)$$

Consider also equation (1) where $f/u = 30$, $K_1 = 1052$ and $K_2 = 1018$:

$$f_c = 1018 - (34/2)/ = 1001 \quad (4)$$

Thus, where $f/u = 60$, a 0.15 percent error exists in the corrected calibration factor and where $f/u = 30$, a 0.10 percent error exists therein. Naturally, where the curve is linear, e.g., $f/u = 150$, no correction is introduced since $(K_1 - K_2)/S = 0$ and $f_c$ must equal $K_2$.

The scaling factor $S_2$ may conveniently be the common water calibration or meter factor of the rotor assemblies whereby the indicator may be directly read in the desired fluid units.

Referring again to FIG. 2, it can be seen that for the lower values of $f/u$ the corrected calibration curve 79 drops off considerably from the ideal calibration factor of 1000 pulses per gallon. At $f/u$ equal to 1.5, for example, the corrected calibration curve 79 is approximately 950 pulses per gallon. While this represents only a 5 percent error, the accuracy increasingly falls off rapidly as $f/u$ decreases.

The increased accuracy at the lower values of $f/u$ may be obtained through the use of the circuits of FIGS. 4 and 5 in conjunction with the flow meter of FIG. 1. Referring now to FIG. 4 wherein circuit elements corresponding to those of FIG. 3 have been given like reference numerals, the output signals $f_2$ and $f_1$ of the detector assemblies 52 and 54, respectively, may be applied to the input terminals 80 and 84, respectively, of a conventional add/subtract circuit 86 and the output signal $f_1 - f_2$ therefrom may be applied to a common input terminal 92 of a pair of conventional add/subtract circuits 94 and 106, by way of a conventional scaler 90. The output signal $f_2$ from the detector assembly 52 may also be applied to the other input terminal 82 of the add/subtract circuit 94 and the output signal $f_2 - (f_1 - f_2)/S_1$ therefrom may be applied to the normally closed contact 112 of a double-throw, single-pole switch 108. The output signal $f_1$ from the detector assembly 54 may also be applied to the other input terminal 104 of the add/subtract circuit 106 and the output signal $f_1 - (f_1 - f_2)/S_1$ therefrom may be applied to the normally open contact 110 of the switch 108. The common terminal 111 of the switch 108 may be connected to the indicator 102 by way of the scaler 98, as earlier described in connection with FIG. 3.

The add/subtract circuits 94 and 106 and the scaler 98 are all conventional in circuitry and operate in the manner of the like denominated previously described in conjunction with FIG. 3. The scaling factor $S_1$ is, of course, equal to 2 in the present example and may be empirically calculated in the manner previously described.

In operation, with switch 108 in the illustrated position, the output signal $f_2 - (f_1 - f_2)/S_1$ from the add/subtract circuit 94 is applied to the indicator 102 by way of the scaler 98 as in the circuit of FIG. 3. However, when $f/u$ decreases to some predetermined value, e.g., 1.5, the switch 108 may be thrown thereby applying the output signal $f_1 - (f_1 - f_2)/S_1$ from the add/subtract circuit 106 to the indicator 102 by way of the scaler 98. This results in more accurate tracking of the ideal calibration curve at low values of $f/u$ as shown by the resultant calibration curve 81 of FIG. 2.

Increased accuracy at the lower values of $f/u$ may also be obtained through the use of the circuit of FIG. 5 wherein like elements have been given reference numerals corresponding to those of FIG. 3 wherever possible to facilitate an understanding thereof.

Referring now to FIG. 5, the output signals $f_2$ and $f_1$ of the detector assemblies 52 and 54 respectively may be applied to the input terminals 80 and 84 respectively of the add/subtract circuit 86 and the output signal therefrom may be applied to the input terminals 92 and 123 respectively of the add/subtract circuit 94 and a second add/subtract circuit 126 by way of the scaler 90 and a second conventional scaler 120. The output signal $f_2$ from the detector assembly 52 may also be applied respectively to the other input terminals 82 and 124 of the add/subtract circuits 94 and 126.

The output signal from the add/subtract circuit 94 may be applied to an input terminal 114 of a two-input terminal AND gate 116 and the output signal therefrom applied to an input terminal 120 of a two-input terminal OR gate 122. The output signal from the add/subtract circuit 126 may be applied to an input terminal 128 of a two-input terminal AND gate 132 and the output signal therefrom applied to the other input terminal 121 of the OR gate 122. The output signal from the OR gate 122 may be applied to the indicator 102 by way of the scaler 98.

An input signal having a level indicative of the value of $f/u$, e.g., high for $f/u$ greater than 2.0 and low for $f/u$ less than 2.0, may be applied directly to the other input terminal 118 of the AND gate 110 and to the other input terminal 130 of the AND gate 132 by way of a conventional inverter circuit 134. This input signal may be derived from any suitable conventional means for determining the value of $f/u$.

In operation, the output signals $(f_1-f_2)/S_1$ and $(f_1-f_2)/S_3$ may be obtained respectively from the add/subtract circuit 86 and the scalers 90 and 120 and applied respectively to the add/subtract circuits 94 and 126 as previously described. The output signal $f_2$ from the detector assembly 52 may also be applied to the add/subtract circuits 94 and 126 and the output signals $f_2 - (f_1 - f_2)/S_1$ and $f_2 + (f_1 - f_2)/S_3$ therefrom may be applied respectively to the AND gates 116 and 132. The AND gates 116 and 132, when enabled, pass the output signals from the add/subtract circuits 94 and 126 respectively to the indicator 102 by way of the OR gate 116 and the scaler 98.

Since the enable signal is connected directly to the AND gate 116 and is connected to the AND gate 132 through the inverter circuit 134, the enabling signals appearing at the AND gates 116 and 132 are mutually exclusive, i.e., the signals will always be at different logic levels.

Thus, when the value of $f/u$ is, for example, greater than 2.0, the AND gate 116 will be enabled by the high signal level at the input terminal 112 and the signal $f_2 - (f_1 - f_2)/S_1$ is passed to the indicator 102. The low signal level at the input terminal 130 of the AND gate 132 inhibits this gate preventing the signal $f_2+(f_1-f_2)/S_3$ from being passed thereby. Of course, when the value of $f/u$ is less than 2.0, the signal level changes and the AND gate 116 will be inhibited and the AND gate 132 enabled. The signal applied to the indicator 102 is thus the algebraic sum of the difference in frequency between the signals $f_1$ and $f_2$ and one of the signals $f_1$ and $f_2$. The signal is related to the curve 79 of FIG. 2 for values of $f/u$ greater than 2.0 and related to the curve 83 of FIG. 2 for values of $f/u$ less than 2.0.

The scaling factor $S_1$ and $S_3$ may be determined as previously described in connection with FIGS. 3 and 4. Since the scaling factor $S_3$ is employed only in the lower range of $f/u$, it should be calculated from values of $K$ in this lower range. For example, using several values of $K$ from the curves of FIG. 2 in the range of $f/u = 2.0$ to $f/u = 0.6$, $S_3$ is calculated as being approximately 6. With this value of $S_3$, the curve 83 of FIG. 2 is approximated. However, should it be desired to employ the same scale factor $S_1$ throughout the range of the meter, the curve 81 will be approximated for the lower values of $f/u$. The scaling factor $S_2$ may, of course, be the common water calibration or meter factor of the rotor assemblies as previously described.

While only a preferred embodiment of the present invention has been illustrated, the scope of the invention is to be limited only by the language of the appended claims when accorded a full range of equivalents.

We claim:

1. A method of compensating the digital output signal of a turbine flowmeter for non-linearity due to viscosity comprising the steps of:
   a. generating a first digital electrical signal having a frequency related to fluid flow;
   b. generating a second digital electrical signal having a frequency related to fluid flow independently of said first signal;
   c. generating a third digital electrical signal having a frequency related to the difference between the frequencies of said first and second signals; and
   d. generating a fourth digital electrical signal responsively to said third signal and one of said first and second signals.

2. The method of claim 1 wherein said first signal is a series of electrical pulses having a frequency non-linearly related to fluid flow, and wherein said second signal is a series of electrical pulses having a frequency non-linearly related to fluid flow.

3. The method of claim 1 wherein the frequency of said fourth signal is related to the difference between the frequency of said third signal and the frequency of one of said first and second signals.

4. The method of claim 1 wherein the frequency of said fourth signal is related to the sum of the frequency of said third signal and the frequency of one of said first and second signals.

5. The method of claim 1 wherein the frequency of said fourth signal is related to the algebraic sum of the frequency of said third signal and one of said first and second signals with the further steps of generating the fifth digital electrical signal having a frequency related to the algebraic sum of the frequency of said third signal and the other of said first and second signals, determining a frequency/kinematic viscosity ratio, and selecting one of said fourth and fifth signals responsively to the value of the determined ratio of frequency/kinematic viscosity.

6. Apparatus comprising:
   a. first and second turbine flowmeter means for generating first and second digital signals having a frequency related to fluid flow;
   b. means for generating a third digital signal having a frequency related to the difference in frequency between said first and second digital signals;
   c. means for generating a fourth digital signal responsively to said third digital signal and to one of said first and second digital signals; and
   d. means for manifesting said fourth digital signal.

7. The apparatus of claim 6 wherein said first and second digital signals are non-linearly related to fluid flow and wherein the frequency of said first signal is greater than the frequency of said second signal.

8. The apparatus of claim 6 wherein the water calibration factors of said flowmeter means are substantially the same.

9. The apparatus of claim 8 wherein the non-linearities of said digital signals with respect to viscous fluids peak at approximately the same ratio of frequency/kinematic viscosity.

10. A flowmeter comprising:
   a. an elongated housing having an axial bore;
   b. a first rotor journaled within the bore of said housing for rotation in response to fluid flow therethrough, said first rotor having a non-linear viscosity calibration curve;

c. a second rotor journaled for rotation within the bore of said housing substantially independently of the rotation of said first rotor in response to fluid flow through the bore of said housing, said second rotor having a non-linear viscosity calibration curve different from that of said first rotor;

d. means for detecting the difference between the speed of rotation of said first and second rotors; and e. means for indicating the algebraic sum of said detected difference in speed and the speed of rotation of one of said rotors.

11. The flowmeter of claim 10 wherein said first and second rotors have substantially the same water calibration constants and wherein said calibration curves are similarly shaped.

12. The flowmeter of claim 11 including a plurality of vanes disposed in the bore of said housing upstream of said first rotor, downstream of said second rotor and intermediate of said first and second rotors, and wherein said detecting means includes a magnetic pickup disposed in flux cutting proximity to each of said rotors, the response of each of said pickups being restricted solely to the adjacent rotors.

13. The flowmeter of claim 12 including a plurality of vanes disposed in the bore of said housing upstream of said first rotor, downstream of said second rotor and intermediate of said first and second rotors.

14. The flowmeter of claim 10 wherein said detecting means includes a magnetic pickup disposed in flux cutting proximity to each of said rotors, the response of each of said pickups being substantially independent of the rotation of one of said rotors.

15. A turbine flowmeter comprising:
a. a conduit;
b. a first rotor journaled for rotation in said conduit in response to fluid flow therethrough;
c. a second rotor axially displaced from said first rotor and journaled for rotation in said conduit in response to fluid flow therethrough independently of the rotation of said first rotor, said second rotor having a non-linear viscosity calibration curve different from that of said first rotor;
d. first detector means for providing an output related to the speed of rotation of said first rotor;
e. second detector means for providing an output related to the speed of rotation of said second rotor; and
f. circuit means responsive to said first detector means for modifying the output of said second detector means.

16. The flowmeter of claim 15 wherein said first detecting means generates a first electrical signal having a frequency related to fluid flow, wherein said second detecting means generates a second electrical signal having a frequency independently related to fluid flow, and wherein said circuit means includes first summing means for algebraically summing the difference between the frequencies of said first and second signals with one of said first and second signals.

17. The flowmeter of claim 16 wherein said circuit means includes second summing means for algebraically summing the difference between the frequencies of said first and second signal with the other of said first and second signals.

18. The flowmeter of claim 17 wherein said circuit means includes means for selecting the output signal from one of said first and second summing means responsively to a frequency/kinematic viscosity ratio.

19. A turbine flowmeter comprising:
a. a conduit;
b. first fluid flow detector means for providing an output related to the flow of fluid through said conduit;
c. second fluid flow detector means for providing an output related to the flow of fluid through said conduit, said second detector means being independent of said first detector means; and,
d. circuit means responsive to said first and second detector means for algebraically summing the difference between the outputs of said first and second detector means with the output of one of said first and second detector means.

20. The flowmeter of claim 19 wherein said circuit means includes means for algebraically summing the difference between the outputs of said first and second detector means with the other of the outputs of said first and second detector means.

21. The flowmeter of claim 20 wherein said circuit means includes means for selectively indicating the output of one of said summing means.

* * * * *